US008860258B2

(12) United States Patent
Matsumoto et al.

(10) Patent No.: US 8,860,258 B2
(45) Date of Patent: Oct. 14, 2014

(54) CONTROL SYSTEM

(75) Inventors: Tsuyoshi Matsumoto, Suita (JP); Tatsuya Iida, Kyoto (JP)

(73) Assignee: OMRON Corporation, Kyoto (JP)

( * ) Notice: Subject to any disclaimer, the term of this patent is extended or adjusted under 35 U.S.C. 154(b) by 543 days.

(21) Appl. No.: 13/006,395

(22) Filed: Jan. 13, 2011

(65) Prior Publication Data
US 2011/0169345 A1 Jul. 14, 2011

(30) Foreign Application Priority Data
Jan. 14, 2010 (JP) ................... P2010-005971

(51) Int. Cl.
H01H 9/54 (2006.01)
G05B 9/02 (2006.01)

(52) U.S. Cl.
CPC ...................... *G05B 9/02* (2013.01)
USPC .......................................................... 307/140

(58) Field of Classification Search
USPC .......................................................... 307/140
See application file for complete search history.

(56) References Cited

U.S. PATENT DOCUMENTS

| 5,548,601 | A * | 8/1996 | Kato et al. ...................... 714/820 |
| 6,614,199 | B1 * | 9/2003 | Bokamper et al. .............. 318/445 |
| 8,072,173 | B2 * | 12/2011 | Hamahata ....................... 318/565 |
| 8,595,827 | B2 * | 11/2013 | Zondler et al. .................. 726/21 |
| 2002/0050933 | A1 | 5/2002 | Donat et al. |
| 2003/0011250 | A1 | 1/2003 | Pullmann et al. |
| 2005/0057868 | A1 | 3/2005 | Pullmann et al. |
| 2005/0063114 | A1 * | 3/2005 | Suhara et al. ................... 361/62 |
| 2008/0067876 | A1 * | 3/2008 | Nitsche et al. ................ 307/326 |
| 2009/0138137 | A1 * | 5/2009 | Iwagami et al. ................ 701/1 |
| 2010/0207720 | A1 | 8/2010 | Frevert |
| 2011/0095718 | A1 * | 4/2011 | Tsai et al. ...................... 318/569 |
| 2012/0005748 | A1 * | 1/2012 | Zondler et al. .................. 726/21 |

FOREIGN PATENT DOCUMENTS

| DE | 10011211 A1 | 9/2001 |
| DE | 10037737 A1 | 2/2002 |
| DE | 102007032827 A1 | 1/2009 |
| JP | 2005-157665 | 6/2005 |
| WO | 03/085313 A2 | 10/2003 |

OTHER PUBLICATIONS

Office Action issued in German Application No. 102011002481.6, mailed on Mar. 22, 2013 and English translation thereof (15 pages).

(Continued)

*Primary Examiner* — Jared Fureman
*Assistant Examiner* — Duc M Pham
(74) *Attorney, Agent, or Firm* — Osha Liang LLP

(57) ABSTRACT

A control system has an input instrument that generates a signal indicating permission and prohibition of running of a load, a power-supply unit that is configured to supply driving power to the load when the load is permitted to run by an input signal from the input instrument, and to cut off the supply of the driving power to the load when the load is prohibited from running by the input signal, and a monitoring device that is configured to monitor the input instrument and the power-supply unit. The power-supply unit is configured to cut off the supply of the driving power to the load when monitoring result of the monitoring device indicates an abnormality of one of the input instrument and the power-supply unit. The control system is compatible with category 2 of ISO 13849-1.

10 Claims, 11 Drawing Sheets

(56) References Cited

OTHER PUBLICATIONS

Patent Abstracts of Japan for patent application with Publication No. 2005-157665, Publication Date: Jun. 16, 2005, 1 page.

Mechanical English translation of Japanese patent application with Publication No. 2005-157665, Publication Date: Jun. 16, 2005, 23 pages.

* cited by examiner

FIG. 13

| CATEGORY | SUMMARY OF REQUIREMENT | SYSTEM BEHAVIOR | PRINCIPLE FOR SAFETY SECUREMENT | MTTF$_d$ OF EACH CHANNEL | DC$_{avg}$ | CCF |
|---|---|---|---|---|---|---|
| B | DESIGN, SELECTION, AND ASSEMBLY ARE PERFORMED ACCORDING TO RELATED STANDARD SO AS TO ENDURE USAGE ENVIRONMENT STRESS. USE BASIC SAFETY PRINCIPLE. | SAFETY FUNCTION IS LOST DURING FAILURE. | MAINLY ESTABLISHED BY SELECTION OF COMPONENT | LOW TO MEDIUM | NOTHING | WITHOUT RELATION SHIP |
| 1 | USE SUFFICIENTLY EXAMINED COMPONENT AND SUFFICIENTLY EXAMINED SAFETY PRINCIPLE IN ADDITION TO REQUIREMENTS OF CATEGORY B. | ALTHOUGH SAFETY FUNCTION IS LOST DURING FAILURE, PROBABILITY OF GENERATING FAILURE IS LOWER THAN THAT OF CATEGORY B. | | High | | |
| 2 | USE SUFFICIENTLY EXAMINED SAFETY PRINCIPLE IN ADDITION TO REQUIREMENTS OF CATEGORY B. CHECK SAFETY FUNCTION AT PROPER INTERVALS BY MACHINE CONTROL SYSTEM. | SAFETY FUNCTION IS LOST WHEN FAILURE IS GENERATED BETWEEN CHECKS. LOSS OF SAFETY FUNCTION IS DETECTED BY CHECK. | | LOW TO HIGH | LOW TO MEDIUM | |
| 3 | USE SUFFICIENTLY EXAMINED SAFETY PRINCIPLE IN ADDITION TO REQUIREMENTS OF CATEGORY B. DESIGN SAFETY-RELATE PART AS FOLLOWS:<br>• SINGLE FAILURE DOES NOT LEAD TO LOSS OF SAFETY FUNCTION<br>• SINGLE FAILURE IS DETECTED AS MUCH AS POSSIBLE | SAFETY FUNCTION IS MAINTAINED EVEN IF SINGLE FAILURE IS GENERATED. HOWEVER, SAFETY FUNCTION IS LOST BY ACCUMULATION OF FAILURE BECAUSE SINGLE FAILURE CANNOT PARTLY BE DETECTED. | MAINLY ESTABLISHED BY STRUCTURE | LOW TO HIGH | LOW TO MEDIUM | |
| 4 | USE SUFFICIENTLY EXAMINED SAFETY PRINCIPLE IN ADDITION TO REQUIREMENTS OF CATEGORY B. DESIGN SAFETY-RELATE PART AS FOLLOWS:<br>• SINGLE FAILURE DOES NOT LEAD TO LOSS OF SAFETY FUNCTION<br>• SINGLE FAILURE IS DETECTED BEFORE NEXT SAFETY FUNCTION IS ACTIVATED. SAFETY FUNCTION IS NOT LOST BY ACCUMULATION OF UNDETECTABLE SINGLE FAILURE | SAFETY FUNCTION IS MAINTAINED EVEN IF SINGLE FAILURE IS GENERATED. PROBABILITY OF ACCUMULATING FAILURE IS LOW BECAUSE OF HIGH DC. FAILURE IS DETECTED WITHIN A CERTAIN TIME IN ORDER TO PREVENT LOSS OF SAFETY FUNCTION. | | High | HIGH, INCLUDING DEFECT ACCUMULATION | 65 POINTS OR MORE |

LOW → HIGH

CONTROL SYSTEM

BACKGROUND OF THE INVENTION

1. Technical Field

The present invention relates to a control system that control drive of a load, particularly to a control system that secures safeness of mechanical equipment.

2. Related Art

Conventionally, a safety circuit that supplies an electric power to a load (such as a motor) that is of a power source for mechanical equipment in the state in which safety is secured is constructed in order to establish work safety of a production site. Generally the conventional safety circuit includes a safety instrument such as a relay unit and a safety controller.

For example, Japanese Unexamined Patent Publication No. 2005-157665 describes a relay unit and a safety controller as the safety instrument. According to Japanese Unexamined Patent Publication No. 2005-157665, the relay unit is operated as follows. The relay unit has a function of monitoring a state of a safety circuit based on an input signal from a safety switch such as an emergency stop switch or a safety area sensor such as a safety door switch and a function of securely cutting off a power supply of mechanical equipment in generating a trouble. The relay unit further has a function of not restarting the mechanical equipment unless the cause of the trouble is removed.

The safety controller disclosed in Japanese Unexamined Patent Publication No. 2005-157665 is configured as follows. The safety controller includes first and second CPUs (Central Processing Units) that control a safety output to a safety output control target such as a magnet contactor based on a safety input from the input instrument such as the safety door switch. The safety controller provides a semiconductor output that is of the safety output. An extension unit that outputs a relay output to the safety output control target according to the safety output can be connected to the safety controller, and the safety controller can detect an abnormality of the extension unit.

FIG. 12 is a view illustrating a configuration example of a conventional safety circuit. Referring to FIG. 12, a control system 200 supplies driving power from a three-phase AC power supply (AC power supply 101) to a motor 102 that is of a load and cuts off the supply of the driving power. For example, the motor 102 is used to drive various mechanical installations in a factory.

The control system 200 includes a door switch 111 that is of an input device, a relay unit 116, and contactors 121 and 122.

The door switch 111 detects that a mechanical guard or cover is closed. A manipulation key 115 attached to a door 114 is inserted in and pulled out from the door switch 111. Therefore, the door switch 111 detects the opening and closing of the door 114.

Contactors 121 and 122 are inserted in and connected to a power-supply line 103 that is of the feeding pathway between the AC power supply 101 and the motor 102. The relay unit 116 turns on/off the contactor 121 based on a signal from the door switch 111.

The relay unit 116 has a function of monitoring the contactors 121 and 122. For example, when the relay unit 116 detects the abnormality of the contactor 121, the relay unit 116 turns off the contactor 122. Therefore, the motor 102 is stopped because the supply of the electric power to the motor 102 is cut off.

The safety instrument disclosed in Japanese Unexamined Patent Publication No. 2005-157665 has a function of checking whether the input instrument and the output instrument are normal. This is because the safety circuit compatible with category 2 of ISO 13849-1 is constructed.

Conventionally, in discussing safety protection in a measure to reduce a machine risk, evaluation of an extent of the risk and a performance criterion of the safety system according to the evaluation are generally expressed by "category" of European Standard EN 954-1 or International Standard ISO 13849-1 based on European Standard EN 954-1. The "category" means an architecture (structure) of a safety control system, and the "category" is based on a so-called definitive technology of an electric mechanism component, which is typified by an accumulated contact technology of a switch or a relay.

FIG. 13 is a view explaining the category defined by ISO 13849-1. Referring to FIG. 13, categories of five stages "B", "1", "2", "3", and "4" are defined in ISO 13849-1. An achievement level of a performance criterion is enhanced as the category progresses from "B" to "4".

In the revised edition of ISO 13849-1, indexes of five stages "a" to "e" called "PL (Performance Level)" are defined to evaluate the safety control system. In the PL, concepts of "reliability" and "quality" are taken in a concept of the conventional "category" to evaluate Mean Time To dangerous Failure (MTTFd), DCavg (Average Diagnostic Coverage), and Common Cause Failure (CCF). The safety control system can quantitatively be evaluated along an actual usage by the PL.

A formal name of the revised edition of ISO 13849-1 is "ISO 13849-1 (Second edition 2006-11-01) Safety of machinery safety-related parts of control systems, Part 1: General principles for design". Hereinafter, occasionally the revised edition of ISO 13849-1 is referred to as "ISO 13849-1:2006". The old edition and revised edition of ISO 13849-1 are collectively referred to as "ISO 13849-1" unless particularly distinguished from each other.

In ISO 13849-1:2006, requirements of the safety control systems in each category are identical to those of the old edition. However, the features of each safety control system are schematized in an easy-to-understand manner while three portions of an I (input instrument), an L (logic operation instrument), and an O (output instrument) are focused around.

FIG. 14 is a block diagram for explaining the requirements of the safety control system required for each category, which are expressed by ISO 13849-1:2006.

Referring to FIG. 14, the structure compatible with the category B and category 1 is realized by the I, L, and O. For example, the structure compatible with the category 2 can be realized by adding a TE (checking instrument) to the I, L, and O. For example, the structure compatible with the category 2 can also be realized by the I, O, and TE. An OTE is a function of performing an operation based on an output of the TE. For example, the OTE may be a function included in the O (output instrument) or a function of an instrument that is different from the I, L, and O.

The structure compatible with the categories 3 and 4 is realized by duplicating the I, L, and O. The category 4 is identical to the category 3 in the structure although the category 4 differs from the category 3 in that higher detection capability is required for the category 4.

As illustrated in FIG. 14, checking whether the input instrument and the output instrument are normal is included in the requirements of the category 2. Because the safety instrument such as the relay unit and the safety controller has the checking function, the safety instrument is compatible with the category 2 of ISO 13849-1.

Although not illustrated in FIG. 12, for example, a general-purpose PLC (Programmable logic controller) performs general control in the control system. The general-purpose PLC is not involved in the safety-related control. This is because the control system is not compatible with the safety standard (category 2 of ISO 13849-1) when the general-purpose PLC performs the safety-related control.

FIG. 15 is a graph for explaining the method for evaluating a performance level defined by ISO 13849-1:2006. Referring to FIG. 15, four parameters including category (indicated by "Cat" in FIG. 15), MTTFd, DCavg, and CCF are used to evaluate the PL.

As illustrated in FIG. 15, for example, the performance level "c" can be achieved by plural combinations of parameters. In other words, the desired performance level can be achieved by the proper combination of the four parameters. Accordingly, in ISO 13849-1:2006, it is said that a degree of freedom is increased in constructing the safety system compared with ISO 13849-1:1999 that is of the old edition.

Thus, ISO 13849-1 is the standard for the safety-related control. However, specific implementation means for satisfying the requirements is not defined by ISO 13849-1. Therefore, it is difficult that the functions defined by ISO 13849-1 are cut into the function that should be realized by the safety instrument and the function that can be realized by a general control instrument (such as the general-purpose PLC). Accordingly, as described in Japanese Unexamined Patent Publication No. 2005-157665 and FIG. 12, conventionally the functions defined by the category 2 of ISO 13849-1 are realized by the dedicated safety instrument.

However, generally a product that receives third-party certificate is used in the safety instrument or the safety component. That is, because the safety dedicated instrument is a special product that is different from a general-purpose product, a price of the safety dedicated instrument tends to become expensive.

On the other hand, as illustrated in FIG. 15, it is believed that the degree of freedom is increased in constructing the safety system by ISO 13849-1:2006. However, according to the conventional technique, the safety system is constructed by the use of the dedicated safety instrument. Therefore, not only cost is increased to construct the safety system, but also the configuration of the safety system is restricted.

SUMMARY

One or more embodiments of the present invention provides a control system that is compatible with the safety standard by a simple configuration.

In accordance with one or more embodiments of the present invention, control system that is compatible with category 2 of ISO 13849-1, the control system includes: an input instrument that generates a signal indicating permission and prohibition of running of a load; a power-supply unit that is configured to supply a driving power to the load when the load is permitted to run by an input signal from the input instrument, and to cut off the supply of the driving power to the load when the load is prohibited from running by the input signal; and a monitoring device that is configured to monitor the input instrument and the power-supply unit, wherein the power-supply unit is configured to cut off the supply of the driving power to the load when monitoring result of the monitoring device indicates an abnormality of one of the input instrument and the power-supply unit.

In the control system according to one or more embodiments of the invention, the input instrument includes: a first signal generating unit that generates a first signal as the input signal input to the power-supply unit; and a second signal generating unit that generates a second signal indicating the permission and prohibition of the running of the load. The power-supply unit outputs a third signal indicating the supply of the driving power to the load and the cutoff of the supply of the driving power, the supply of the driving power and the cutoff of the supply of the driving power being performed by the power-supply unit, and the monitoring device monitors the input instrument and the power-supply unit based on the second signal and the third signal.

In the control system according to one or more embodiments of the invention, the monitoring device monitors a time difference between timing of a change of the second signal and timing of a change of the third signal, when the load is permitted to run, and when the load is prohibited from running.

In the control system according to one or more embodiments of the invention, the monitoring device detects that the input instrument and the power-supply unit are normal by detecting that the time difference falls within a predetermined time.

In the control system according to one or more embodiments of the invention, the monitoring device detects that the input instrument is abnormal, when a state of the second signal is not changed so as to indicate that the load is prohibited from running within a reference time since a state of the third signal is changed so as to indicate that the supply of the driving power to the load is cut off.

In the control system according to one or more embodiments of the invention, the monitoring device detects that the power-supply unit is abnormal, when a state of the third signal is not changed so as to indicate that the driving power is supplied to the load within a reference time since a state of the second signal is changed so as to indicate that the load is permitted to run.

In the control system according to one or more embodiments of the invention, the power-supply unit includes first and second contactors that are inserted in and connected to a feeding pathway between the load and the power-supply unit, and the first contactor includes: a first relay that is provided in the feeding pathway to become an opened state and a closed state according to the first signal; and a second relay that is opened and closed independently of the first relay to generate the third signal.

Preferably the control system according to one or more embodiments of the invention further includes a control device that is configured to control to put the first relay in the opened state and the closed state according to the input signal from the input instrument.

In the control system according to one or more embodiments of the invention, the load is a motor, and the power-supply unit is a servo driver that drives the motor.

According to one or more embodiments of the invention, the control system compatible with the safety standard can be implemented while the configuration of the control system is simplified.

BRIEF DESCRIPTION OF THE DRAWINGS

FIG. 13 is a view explaining a category defined by ISO 13849-1;

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In the following drawings, the identical or equivalent portion is designated by the identical numeral, and the overlapping description is omitted.

First Embodiment

Figure 1:
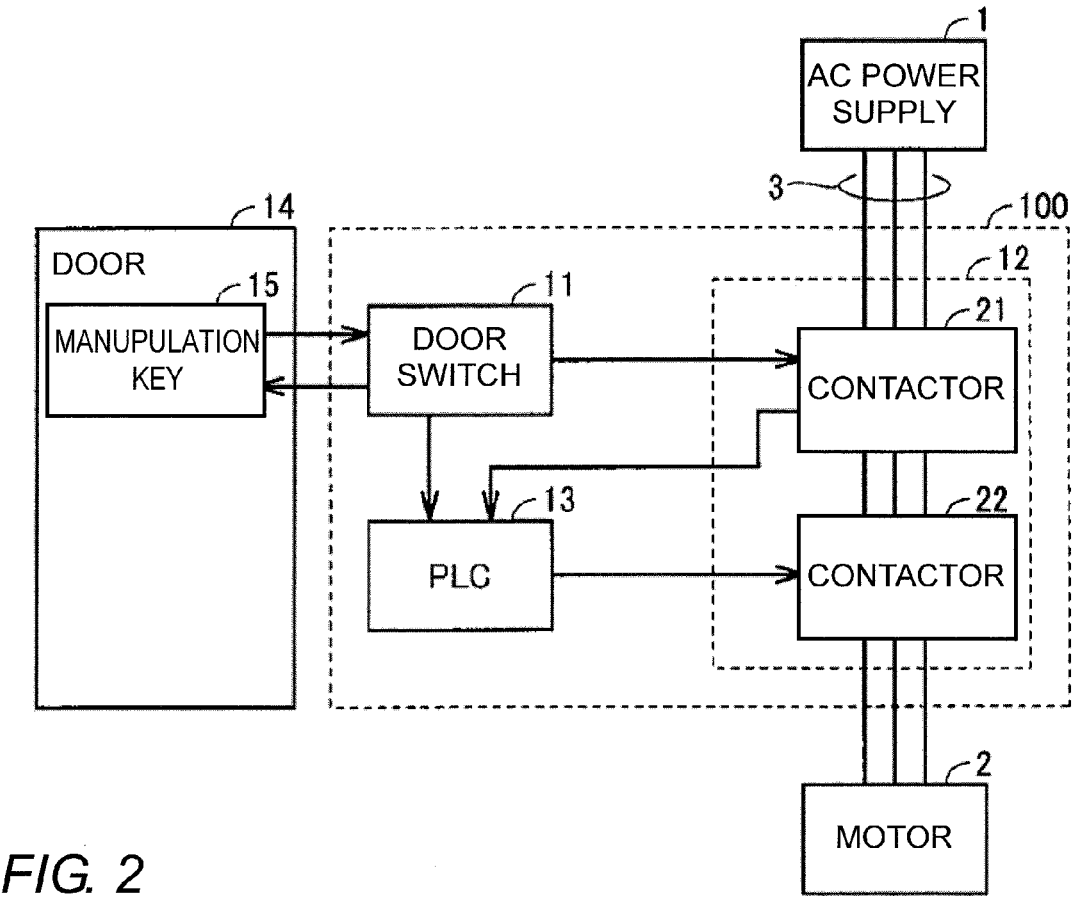
FIG. 1 is a configuration diagram illustrating a control system according to a first embodiment of the invention.

FIG. 1 is a configuration diagram illustrating a control system according to a first embodiment of the invention. Referring to FIG. 1, a control system 100 supplies a driving power from an AC power supply 1 to a motor 2 that is of the load, and the control system 100 cuts off the supply of the driving power. For example, the motor 2 is an AC servo motor.

The AC power supply 1 outputs three-phase alternating current as the driving power of the motor 2. There is no particular limitation to applications of the motor 2. For example, the motor 2 is used to drive various machines in a factory.

The control system 100 includes a door switch 11 that is of the input instrument, a power-supply unit 12, and a PLC 13.

The door switch 11 detects that a mechanical guard or cover is closed. A manipulation key 15 attached to a door 14 is inserted in and pulled out from the door switch 11. Therefore, the door switch 11 detects the opening and closing of the door 14, and the door switch 11 outputs a signal indicating the opening and closing of the door 14 to the power-supply unit 12 and the PLC 13.

The configuration of the door switch is not limited to the above-described configuration. For example, the door switch may be configured to be able to detect the opened and closed states of the door in a non-contact manner. For the non-contact door switch, for example, an output of the door switch is turned on when a dedicated actuator comes close to the door switch body, and the output of the door switch is turned off when the actuator moves away from the door switch body.

The power-supply unit 12 is configured to supply the AC power to the motor 2 and cut off the supply of the AC power to the motor 2 based on a signal from the door switch 11. In the first embodiment, the power-supply unit 12 includes contactors 21 and 22 that are inserted in and connected to a power-supply line 3 that is of the feeding pathway between the AC power supply 1 and the motor 2. The contactor 21 is turned on/off by a signal from the door switch 11. On the other hand, the contactor 22 is turned off by a signal from the PLC 13. As used herein the "contactor is turned on" shall mean that the contactor is in the closed state (conduction state), and the "contactor is turned off" shall mean that the contactor is in the opened state (non-conduction state).

The power-supply unit 12 may include electromagnetic switchgears (magnet switch) instead of the contactors 21 and 22. A contactor and a thermal relay that protects an overload of the motor 2 are combined in the electromagnetic switchgear. The thermal relay is operated so as to open the contactor when the motor becomes the overload to pass an overcurrent for a certain time or more.

Figure 2:
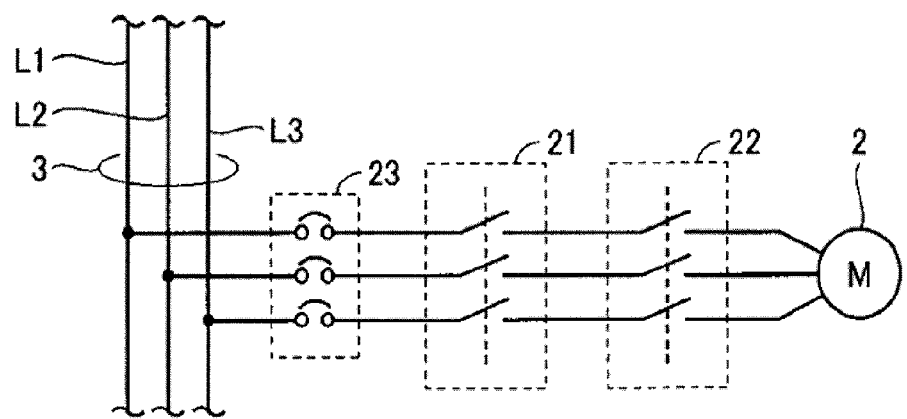
FIG. 2 is a view for explaining electric connection between a motor and a power-supply line.

FIG. 2 is a view for specifically explaining electric connection between the motor and the power-supply line. Referring to FIG. 2, the power-supply line 3 includes lines L1, L2, and L3. For example, the lines L1, L2, and L3 correspond to an R-phase, an S-phase, and a T-phase of the three-phase alternating current, respectively. The motor 2 is connected to the power-supply line 3 through the contactor 21 and 22 and a circuit breaker 23. A configuration in which the breaker 23 is not provided is also included in the first embodiment.

Referring to FIG. 1, the PLC 13 monitors the door switch 11 and the power-supply unit 12 (specifically, contactor 21) and outputs the monitoring result to the contactor 22.

When the PLC 13 detects that one of the door switch 11 and the contactor 21 is abnormal, the contactor 22 is turned off based on the monitoring result (detection result) of the PLC 13. The power-supply unit 12 cuts off the supply of the driving power to the motor 2 by turning off the contactor 22.

The PLC 13 is a general-purpose PLC that acts as the monitoring device by performing processing following a previously-prepared program. The PLC 13 does not have a function of performing safety-related control although the PLC 13 has the function of monitoring the instrument and the function of outputting the monitoring result. This is because the configuration of the control system 100 is not compatible with the category 2 of ISO 13849-1 when the general-purpose PLC performs the safety-related control. The PLC 13 is specialized in the above-described functions, whereby the control system 100 has the configuration compatible with the category 2 of ISO 13849-1. Specifically, the door switch 11, the contactor 21, the PLC 13, and the contactor 21 realize the functions of I, TE, O, and OTE in the structure compatible with category 2 of ISO 13849-1, respectively.

Figure 15:
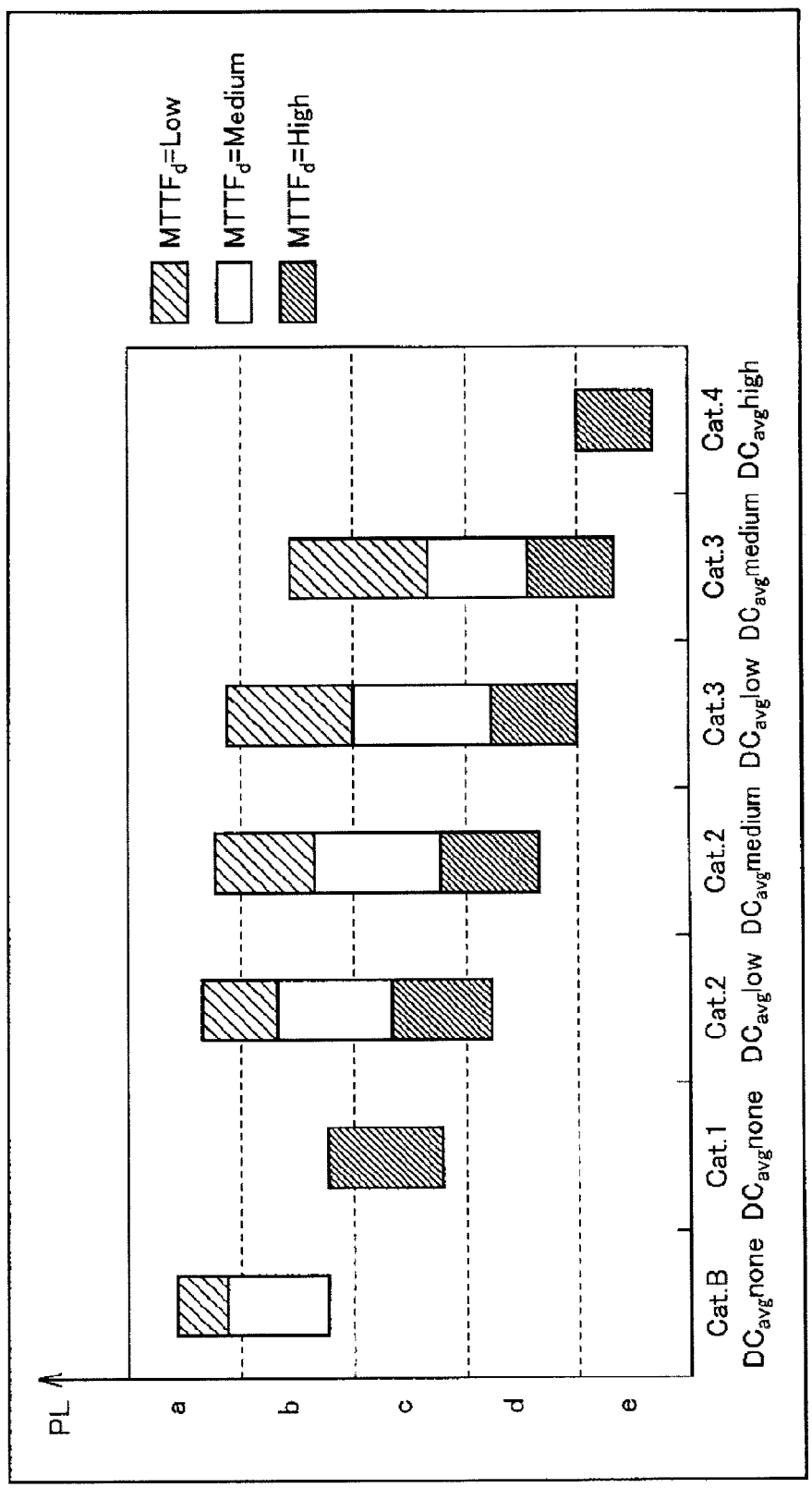
FIG. 15 is a graph for explaining a method for evaluating a performance level defined by ISO 13849-1:2006.

As illustrated in FIG. 15, according to ISO 13849-1:2006, the PL (Performance Level) that can be achieved in the category 2 becomes "a" to "d". Accordingly, the system compatible with the performance levels "a" to "d" of ISO 13849-1:2006 can be constructed in the first embodiment.

The signal input from the door switch 11 to the contactor 21 corresponds to the "first signal" of one or more embodiments of the invention. The signal input from the door switch 11 to the PLC 13 corresponds to the "second signal" of one or more embodiments of the invention. The signal input from the contactor 21 to the PLC 13 corresponds to the "third signal" of one or more embodiments of the invention.

Figure 3:
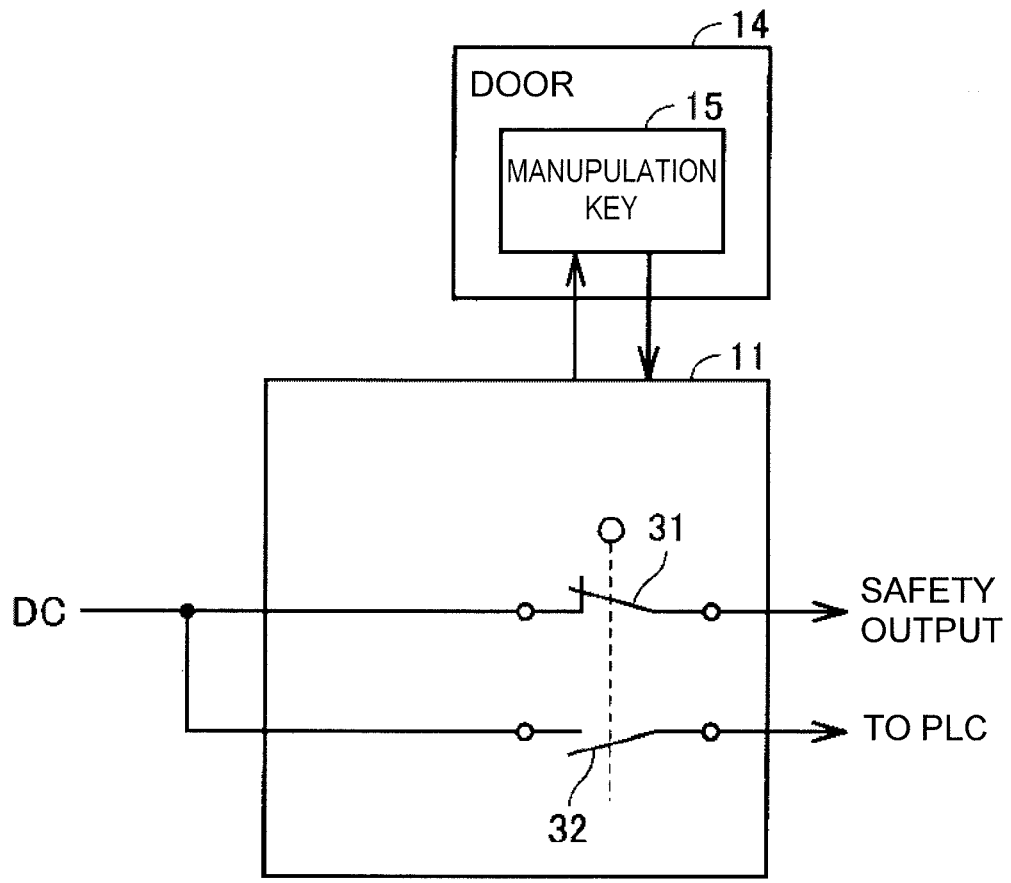
FIG. 3 is a schematic diagram for explaining a configuration of a main part of a door switch illustrated in FIG. 1.

FIG. 3 is a schematic diagram for explaining a configuration of a main part of the door switch illustrated in FIG. 1. Referring to FIG. 3, the door switch 11 includes switches 31 and 32. When the door switch 11 is normally operated, the switches 31 and 32 are operated in a complementary manner. For example, when the manipulation key 15 is inserted in the door switch 11 by closing the door 14, the switch 31 is turned on while the switch 32 is turned off. On the other hand, when the manipulation key 15 is pulled out from in the door switch 11 by opening the door 14, the switch 31 is turned off while the switch 32 is turned on.

A DC voltage (for example, 24 V) is provided to one end of the switch 31, and a signal (first signal) that is of a safety output is output from the other end of the switch 31. The safety output becomes the signal that turns on/off the contactor 21. The DC voltage is provided to one end of the switch 32, and a signal (second signal) generated by the switch 32 is provided to the PLC 13.

Figure 4:
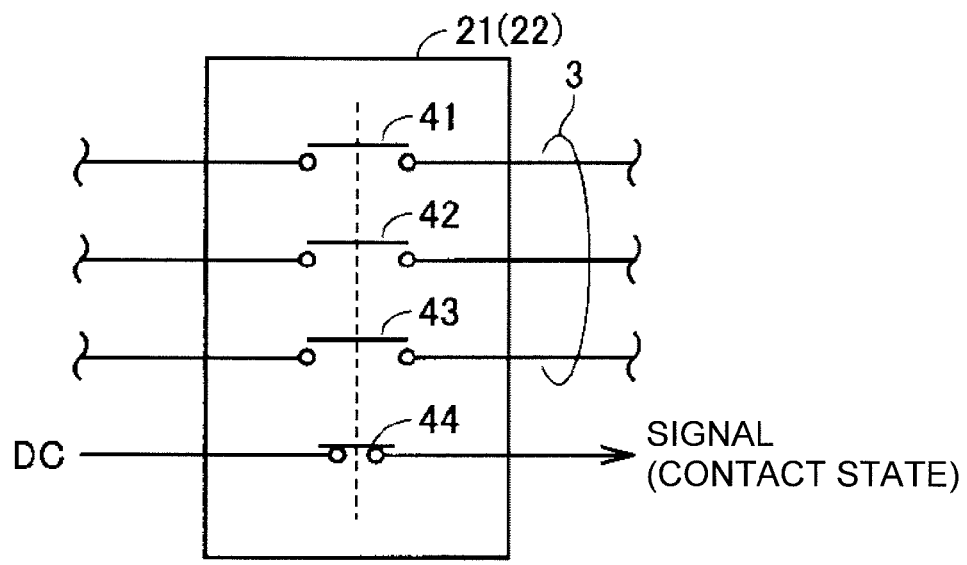
FIG. 4 is a schematic diagram for explaining a configuration of a main part of a contactor illustrated in FIG. 1.

FIG. 4 is a schematic diagram for explaining a configuration of a main part of the contactor illustrated in FIG. 1. Referring to FIG. 4, each of the contactors 21 and 22 includes relays 41 to 43 that are of a main contact and a relay 44 that is of an auxiliary contact.

Each of the relays 41 to 43 is provided on the power-supply line corresponding to each phase of the three-phase power-supply line 3. The relay 44 interlocks with the relays 41 to 43. In the first embodiment, the relay 44 is used to output a signal indicating an operating state of the contactor.

The relay 44 and the relays 41 to 43 are operated in a complementary manner. The relay 44 is in the closed state when the relays 41 to 43 are in the opened state. On the other hand, the relay 44 is in the opened state when the relays 41 to 43 are in the closed state. A DC voltage (for example, 24 V) is provided to one end of the relay 44, and a signal indicating the state of the contactor is output from the other end of the relay 44. A signal (third signal) generated by the relay 44 of the contactor 21 is input to the PLC 13. The relays 41 to 43 of the contactor 21 are provided on the feeding pathway, and the relays 41 to 43 are put in the opened state and the closed state by the safety output (first signal) from the door switch 11. The relay 44 of the contactor 21 is opened and closed independently of the relays 41 to 43 (in the complementary manner) to generate the signal (third signal). The relays 41 to 43 correspond to the "first relay" of one or more embodiments of the invention and the relay 44 corresponds to the "second relay" of one or more embodiments of the invention.

For example, the relays illustrated in FIG. 4 are implemented by mechanical relays. Alternatively, each relay may be implemented by a semiconductor element (such as a transistor and a solid-state relay).

Figure 5:
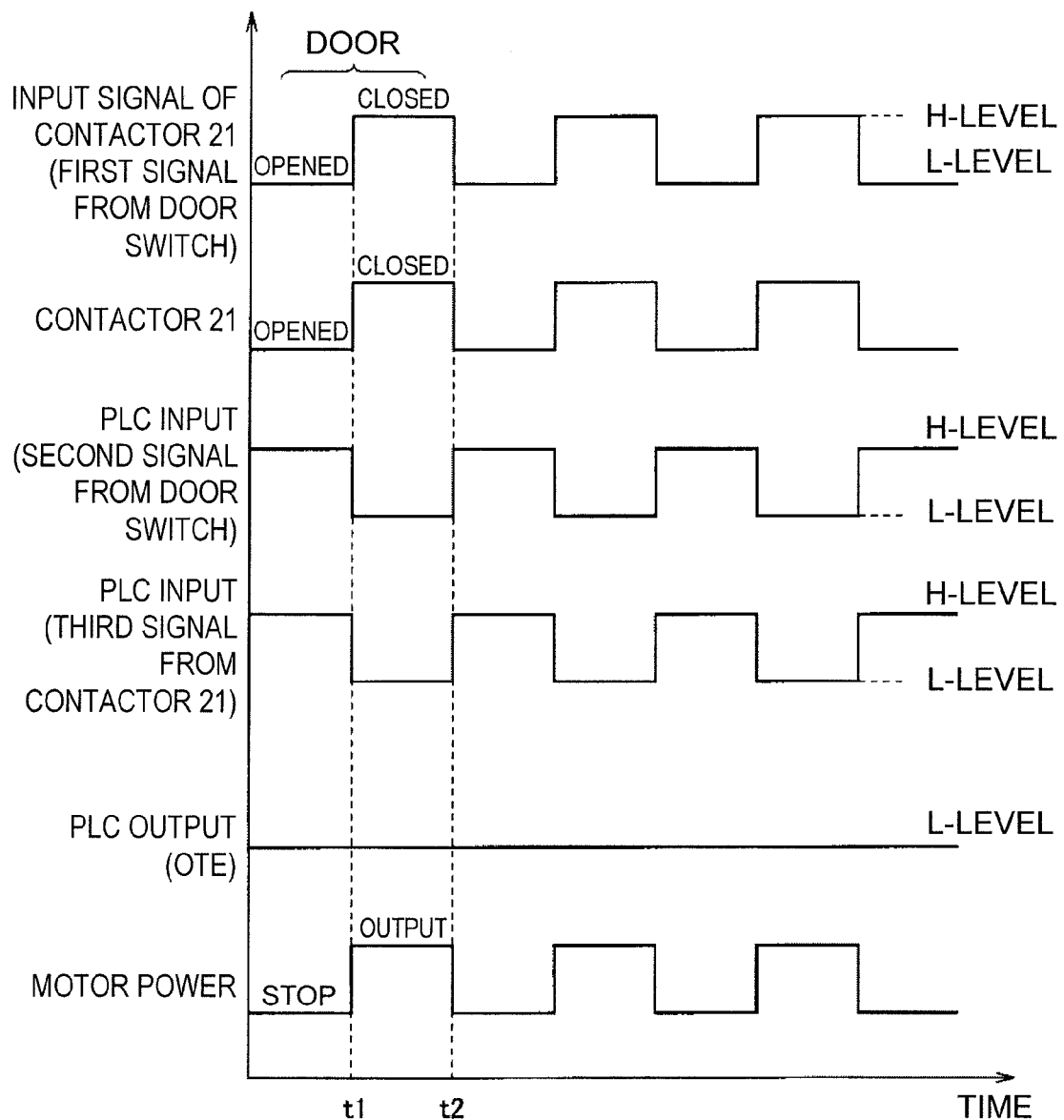
FIG. 5 is a timing chart for explaining an operation of the control system when both the door switch and a power-supply unit are normal.

FIG. 5 is a timing chart for explaining an operation of the control system when both the door switch and the power-supply unit are normal. In the following operation, the contactor 22 is in the closed state unless otherwise noted.

The case where the door switch 11 is in the opened state, that is, the case where the door is opened will be described with reference to FIG. 5. The signal (first signal) input from the door switch 11 to the contactor 21 has an L (logical low) level. That is, the first signal indicates that the motor 2 is prohibited from running.

Therefore, the contactor 21 (the states of the relays 41 to 43 that are of the main contact) is in the opened state, and the supply of the driving power from the AC power supply 1 to the motor 2 is cut off, thereby stopping the output of the power from the motor 2.

The signal (second signal) input from the door switch 11 to the PLC 13 also indicates that the motor 2 is prohibited from running. However, because the second signal level is inverted with respect to the first signal level, the second signal becomes an H (logical high) level.

Because the main contact of the contactor 21 is in the opened state, the auxiliary contact of the contactor 21 is in the closed state. Accordingly, the signal (third signal) input from the contactor 21 to the PLC 13 has the H-level. At this point, the third signal indicates that the supply of the driving power to the motor 2 is cut off.

The door 14 is closed at a time t1. Therefore, the signal input from the door switch 11 to the contactor 21 is changed from the L-level to the H-level. That is, the first signal indicates that the motor 2 is permitted to run. Because the contactor 21 becomes the closed state in response to the first signal, the electric power is supplied from the AC power supply 1 to the motor 2, whereby the motor 2 outputs the power.

At this point, both the second signal input from the door switch 11 to the PLC 13 and the signal input from the contactor 21 to the PLC 13 are changed from the H-level to the L-level. That is, the second signal indicates that the motor 2 is permitted to run, and the third signal indicates that the driving power is supplied to the motor 2.

The PLC 13 detects that the third signal from the contactor 21 is changed from the H-level to the L-level within a predetermined time since the second signal from the door switch 11 is changed from the H-level to the L-level. In such cases, the PLC 13 detects that the door switch 11 and the power-supply unit 12 (contactor 21) are normal, and the PLC 13 maintains the signal output to the contactor 22 (the instrument realizing the OTE function) in the L-level. Because the signal output from the PLC 13 to the contactor 22 is in the L-level, the contactor 22 is maintained in the closed state. That is, the signal output from the PLC 13 to the contactor 22 indicates that the door switch 11 and the contactor 21 are normal.

The door 14 is opened at a time t2. At this point, the signal input from the door switch 11 to the contactor 21 is changed from the H-level to the L-level. That is, the first signal from the door switch 11 indicates that the motor 2 is prohibited from running. Because the contactor 21 becomes the opened state in response to the first signal, the supply of the driving power to the motor 2 is cut off, thereby stopping the motor 2.

Both the second signal input from the door switch 11 to the PLC 13 and the third signal input from the contactor 21 to the PLC 13 are changed from the L-level to the H-level. Similarly to the monitoring at the time t1, the PLC 13 detects that the third signal from the contactor 21 is changed from the L-level to the H-level within a predetermined time since the first signal from the door switch 11 is changed from the L-level to the H-level. In such cases, the PLC 13 detects that the door switch 11 and the power-supply unit 12 (contactor 21) are normal, and the PLC 13 maintains the signal output to the contactor 22 in the L-level.

Thus, the PLC 13 monitors both the door switch 11 and the contactor 21 based on the second signal from the door switch 11 and the third signal from the contactor 21. Specifically, the PLC 13 monitors a time difference between the time the second signal is changed and the time the third signal is changed, when the motor 2 is permitted to run (time t1), and when the motor 2 is prohibited from running (time t2). The PLC 13 detects that the time difference falls within a predetermined time, whereby the PLC 13 detects that both the door switch 11 and the contactor 21 are normal.

The contactor 21 is operated in response to the signal from the door switch 11. Therefore, the contactor 21 is operated while slightly delayed from the operation of the door switch 11. The "predetermined time" is determined to a large value (for example, hundreds milliseconds) in which the slightly delayed time (for example tens milliseconds) of the operation can be omitted.

Figure 6:
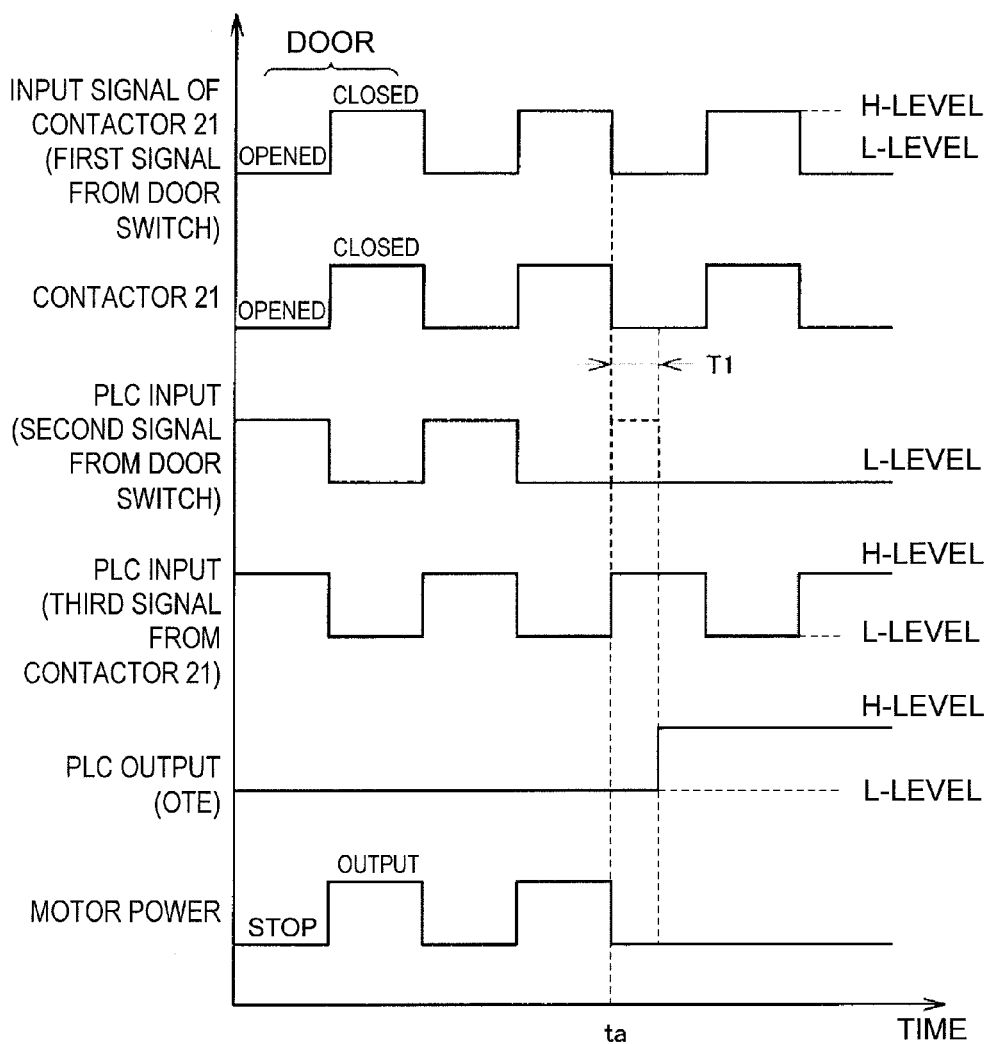
FIG. 6 is a timing chart for explaining an operation of the control system when the door switch is abnormal.

FIG. 6 is a timing chart for explaining an operation of the control system when the door switch is abnormal. Referring to FIG. 6, because the operation of the control system before a time ta is similar to the above-described operation, the detailed description is not repeated. Because the door 14 is opened at the time ta, the first signal input from the door switch 11 to the contactor 21 is changed from the H-level to the L-level. That is, the first signal indicates that the motor 2 is prohibited from running. The contactor 21 becomes the opened state in response to the first signal, thereby stopping the motor 2.

At the time ta, the third signal input from the contactor 21 to the PLC 13 is changed from the L-level to the H-level. That is, the third signal is changed to the state indicating that the supply of the driving power to the motor 2 is cut off. However, the second signal input from the door switch 11 to the PLC 13 is maintained in the L-level even after the time ta. That is, the second signal is not changed to the state (H-level) in which the motor 2 is prohibited from running.

The PLC 13 monitors whether the signal input from the door switch 11 is changed from the L-level to the H-level within a predetermined time T1 since the level of the signal input from the contactor 21 is changed (time ta). Although the predetermined time T1 elapses since the time ta, the second signal from the door switch 11 is maintained in the L-level due to the abnormal door switch 11. Therefore, the PLC 13 changes the output signal from the L-level to the H-level.

The contactor 22 becomes the opened state by changing the signal output from the PLC 13 to the H-level. When the contactor 22 becomes the opened state, the electric power is not supplied to the motor 2 even if the contactor 21 is in the closed state. Accordingly, the motor 2 remains stopped after the time ta.

The contactor 22 cuts off the supply of the electric power from the AC power supply 1 to the motor 2 based on the monitoring result of the PLC 13, when the PLC 13 detects that the door switch 11 that is of the input instrument is abnormal. Accordingly, the motor 2 is stopped when the input instrument is abnormal.

Figure 7:
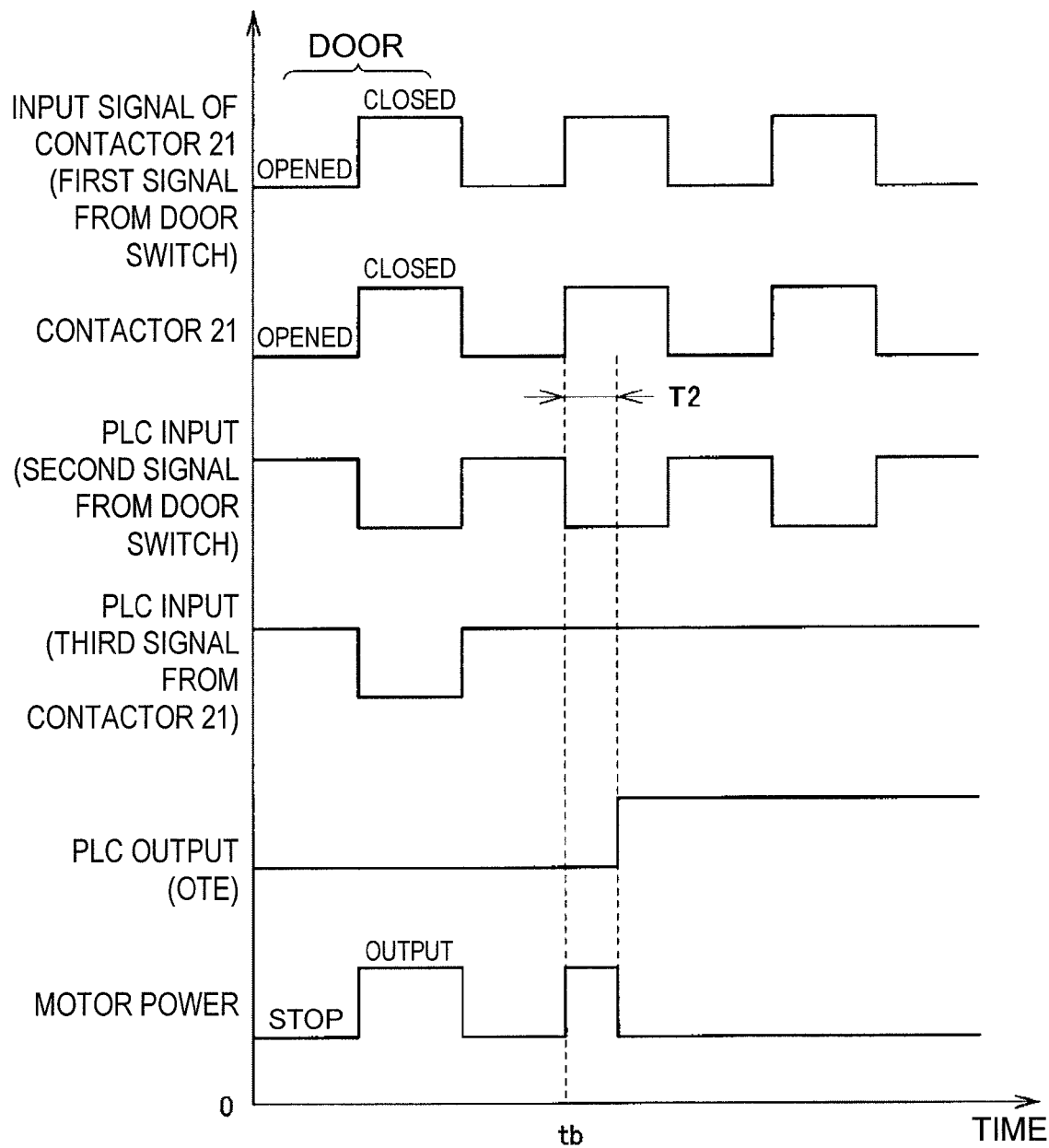
FIG. 7 is a timing chart for explaining an operation of the control system when the contactor illustrated in FIG. 1 is abnormal.

FIG. 7 is a timing chart for explaining an operation of the control system when the contactor 21 illustrated in FIG. 1 is abnormal. Referring to FIG. 7, because the operation of the control system before a time tb is similar to the operation illustrated in FIG. 5, the detailed description is not repeated. Because the door 14 is closed at the time tb, the first signal input from the door switch 11 to the contactor 21 is changed from the L-level to the H-level. That is, the first signal indicates that the motor 2 is permitted to run. Because the contactor 21 becomes the closed state in response to the first signal, the driving power is supplied to the motor 2, whereby the motor 2 outputs the power.

At the time tb, the second signal input from the door switch 11 to the PLC 13 is changed from the H-level to the L-level. That is, the second signal is changed to the state indicating that the motor 2 is permitted to run. However, the third signal input from the contactor 21 to the PLC 13 is maintained in the H-level even after the time tb. That is, the third signal is not changed to the state (L-level) in which the driving power is supplied to the motor 2.

The PLC 13 monitors whether the signal input from the contactor 21 is changed from the H-level to the L-level within a predetermined time T2 since the level of the signal input from the door switch 11 is changed (time tb). Although the predetermined time T2 elapses since the time tb, the third signal from the contactor 21 is maintained in the H-level due to the abnormal contactor 21. Therefore, the PLC 13 changes the output signal from the L-level to the H-level.

Similarly to the operation illustrated in FIG. 6, the contactor 22 becomes the opened state because the signal output from the PLC 13 is the H-level, thereby stopping the motor 2. Although the motor 2 outputs the power until the predetermined time T2 elapses since the time tb, the motor 2 is stopped after that.

The contactor 22 cuts off the supply of the electric power from the AC power supply 1 to the motor 2 based on the monitoring result of the PLC 13, when the PLC 13 detects that the contactor 21 is abnormal. Accordingly, the motor 2 is stopped when the power-supply unit 12 (contactor 21) is abnormal.

As described above, the configuration compatible with the category 2 of ISO 13849-1 can be realized by I (input instrument), O (output instrument), and TE (checking instrument) that monitors I and O. According to the first embodiment, the control system includes the door switch 11 that is of the input instrument, the contactor 21 that is of the output instrument, and the general-purpose PLC 13 that is of the checking instrument. Accordingly, the control system compatible with the category 2 of the ISO 13849-1 can be constructed in the first embodiment.

According to the first embodiment, the general-purpose PLC checks (monitoring function) the input instrument and the output instrument. Therefore, the control system compatible with the category 2 of the ISO 13849-1 can be implemented without use of the dedicated safety control instrument such as the safety controller. Accordingly, the control system compatible with the safety standard can be constructed by the simple configuration in the first embodiment.

According to the first embodiment, the expensive safety control instrument is eliminated, so that the cost of the control system can be reduced.

Second Embodiment

Figure 8:
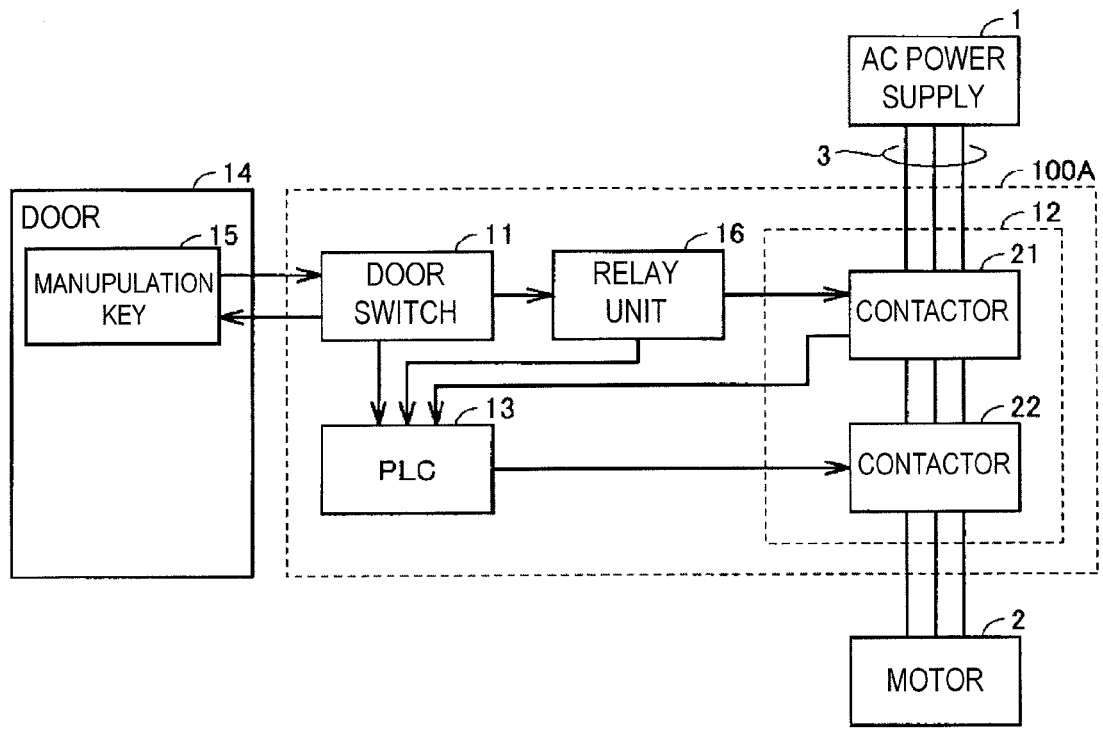
FIG. 8 is a configuration diagram illustrating a control system according to a second embodiment of the invention.

FIG. 8 is a configuration diagram illustrating a control system according to a second embodiment of the invention. Referring to FIGS. 1 and 8, a control system 100A of the second embodiment differs from the control system 100 in that the control system 100A further includes a relay unit 16. Because other configurations of the control system 100A are similar to those of the control system 100, the overlapping description is omitted. In the second embodiment, the PLC 13 monitors not only the door switch 11 and the contactor 21 but also the relay unit 16.

The relay unit 16 acts as not only the control device that turns on/off the contactor 21 but also the safety instrument. In the second embodiment, the relay unit 16 that receives the signal from the door switch 11 turns on/off the contactor 21. That is, similarly to the first embodiment, the contactor 21 is opened and closed in response to the first signal from the door switch 11 in the second embodiment.

Basically an operation of the control system 100A is similar to the operation of the control system 100 of the first embodiment. Specifically the operation of the control system 100A is similar to the operation illustrated in FIGS. 5 to 7. However, as described above, the relay unit 16 turns on/off the contactor 21.

When the manipulation key 15 provided in the door 14 is inserted in the door switch 11 by closing the door 14, the relay unit 16 sets the signal output to the contactor 21 to the H-level. On the other hand, when the manipulation key 15 is pulled out from the door switch 11 by opening the door 14, the relay unit 16 sets the signal output to the contactor 21 to the L-level. That is, the relay unit 16 outputs the signal having the same level as the first signal input from the door switch 11.

In the second embodiment, similarly to the first embodiment, the general-purpose PLC monitors the input instrument and the output instrument. According to the second embodiment, similarly to the first embodiment, the control system compatible with the safety standard can advantageously be implemented by the simple configuration.

Third Embodiment

Figure 9:
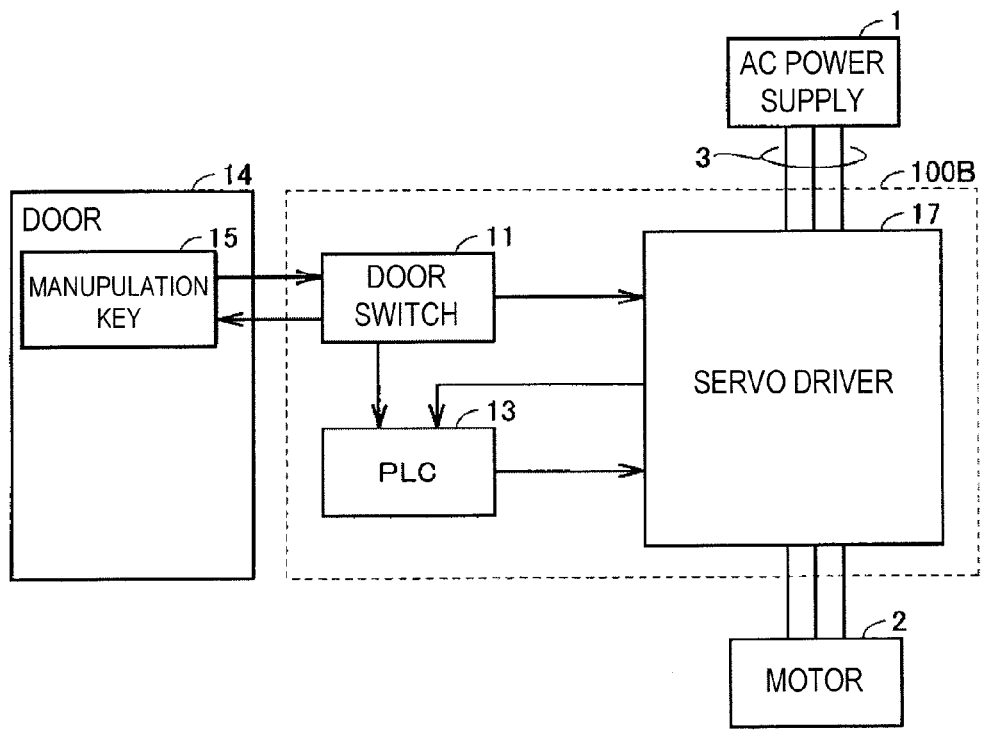
FIG. 9 is a configuration diagram illustrating a control system according to a third embodiment of the invention.

FIG. 9 is a configuration diagram illustrating a control system according to a third embodiment of the invention. Referring to FIGS. 1 and 9, a control system 100B of the third embodiment differs from the control system 100 in that the control system 100B includes a servo driver 17 instead of the power-supply unit 12 including the contactors 21 and 22. Because other configurations of the control system 100B are similar to those of the control system 100, the overlapping description is omitted.

In the third embodiment, the servo driver 17 realizes the function of supplying the driving power to the motor 2 and the function of cutting off the supply of the driving power to the motor 2. The servo driver 17 realizes at least the functions of O and OTE in the structure of the category 2 of ISO 13849-1.

The PLC 13 monitors the door switch 11 and the servo driver 17 and outputs the monitoring result to the servo driver 17.

Based on the first signal from the door switch 11, the servo driver 17 supplies the driving power to the motor 2 and cuts off the supply of the driving power. When the first signal from the door switch 11 indicates that the door 14 is closed (that is, the motor 2 is permitted to run), the servo driver 17 supplies the electric power from the AC power supply 1 to the motor 2. On the other hand, when the first signal output from the door switch 11 indicates that the door 14 is opened (that is, the motor 2 is prohibited from running), the servo driver 17 cuts off the supply of the electric power from the AC power supply 1 to the motor 2. The servo driver 17 outputs the signal (third signal), which indicates the supply of the electric power to the motor 2 and the cutoff of the supply of the electric power, to the PLC 13.

The PLC 13 monitors the door switch 11 and the servo driver 17 based on the second signal from the door switch 11 and the third signal from the servo driver 17. When detecting the abnormality of the door switch 11 or servo driver 17, the PLC 13 transmits the signal indicating the detection result to the servo driver 17. The servo driver 17 cuts off the supply of the electric power from the AC power supply 1 to the motor 2 in response to the signal from the PLC 13.

An operation of the control system 100B is similar to the operation of the control system 100 of the first embodiment. Specifically the operation of the control system 100B is similar to the operation illustrated in FIGS. 5 to 7. "The closed state of the contactor 21" illustrated in FIGS. 5 to 7 corresponds to the state in which the servo driver 17 supplies the electric power to the motor 2 in the third embodiment. "The opened state of the contactor 21" illustrated in FIGS. 5 to 7 corresponds to the state in which the servo driver 17 cuts off the supply of the electric power from the AC power supply 1 to the motor 2 in the third embodiment. "The PLC input (the third signal from the contactor 21)" illustrated in FIGS. 5 to 7 corresponds to the signal input from the servo driver 17 to the PLC 13 in the third embodiment.

When detecting the abnormality of the door switch 11 or servo driver 17, the PLC 13 changes the signal output to the servo driver 17 from the L-level to the H-level. Therefore, the servo driver 17 cuts off the supply of the electric power from the AC power supply 1 to the motor 2.

In the third embodiment, similarly to the first embodiment, the general-purpose PLC monitors the input instrument and the output instrument (in the third embodiment, the servo driver). According to the third embodiment, similarly to the first embodiment, the control system compatible with the safety standard can advantageously be implemented by the simple configuration.

Fourth Embodiment

Figure 10:
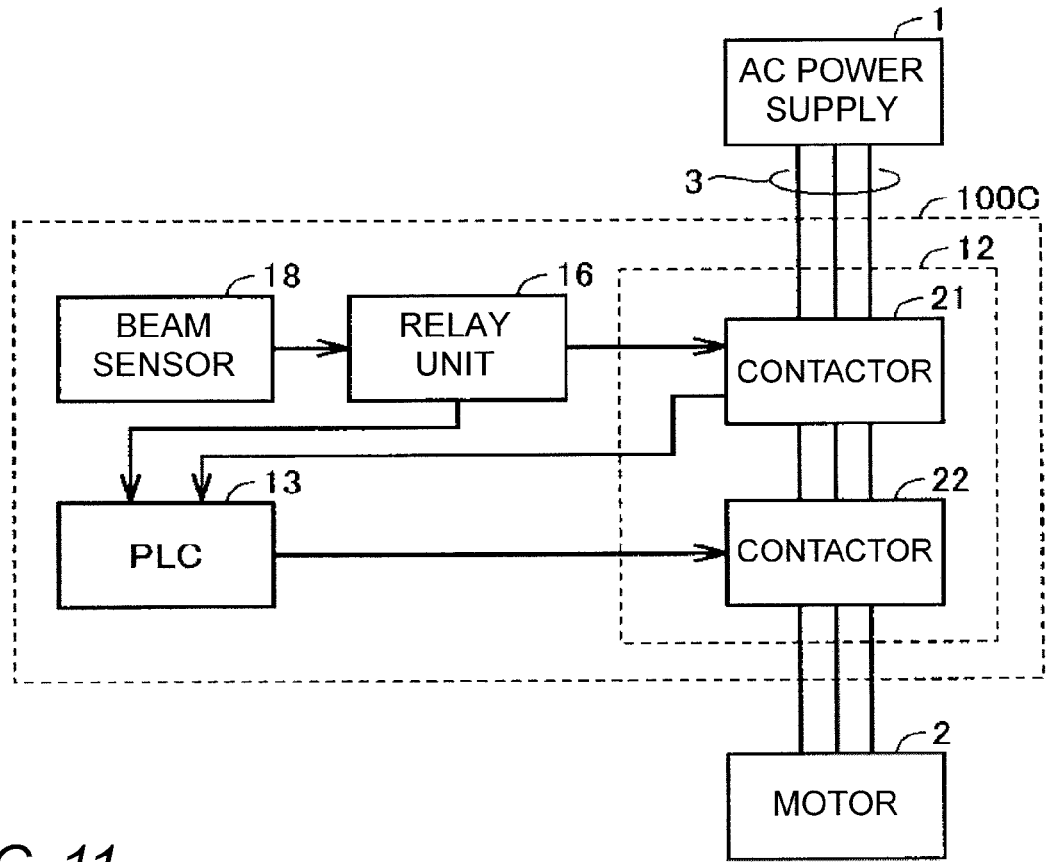
FIG. 10 is a configuration diagram illustrating a control system according to a fourth embodiment of the invention.

FIG. 10 is a configuration diagram illustrating a control system according to a fourth embodiment of the invention. Referring to FIGS. 8 and 10, a control system 100C of the fourth embodiment differs from the control system 100A of the second embodiment in that the control system 100C includes a beam sensor 18 instead of the door switch 11. Because other configurations of the control system 100C are similar to those of the control system 100A, the overlapping description is omitted.

Figure 11:
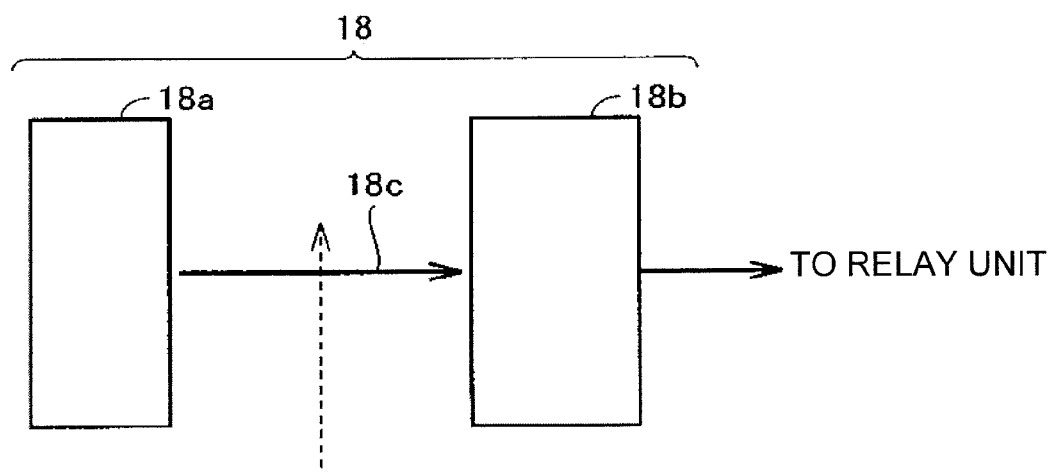
FIG. 11 is a schematic diagram illustrating a configuration of a beam sensor illustrated in FIG. 10.
Figure 12:
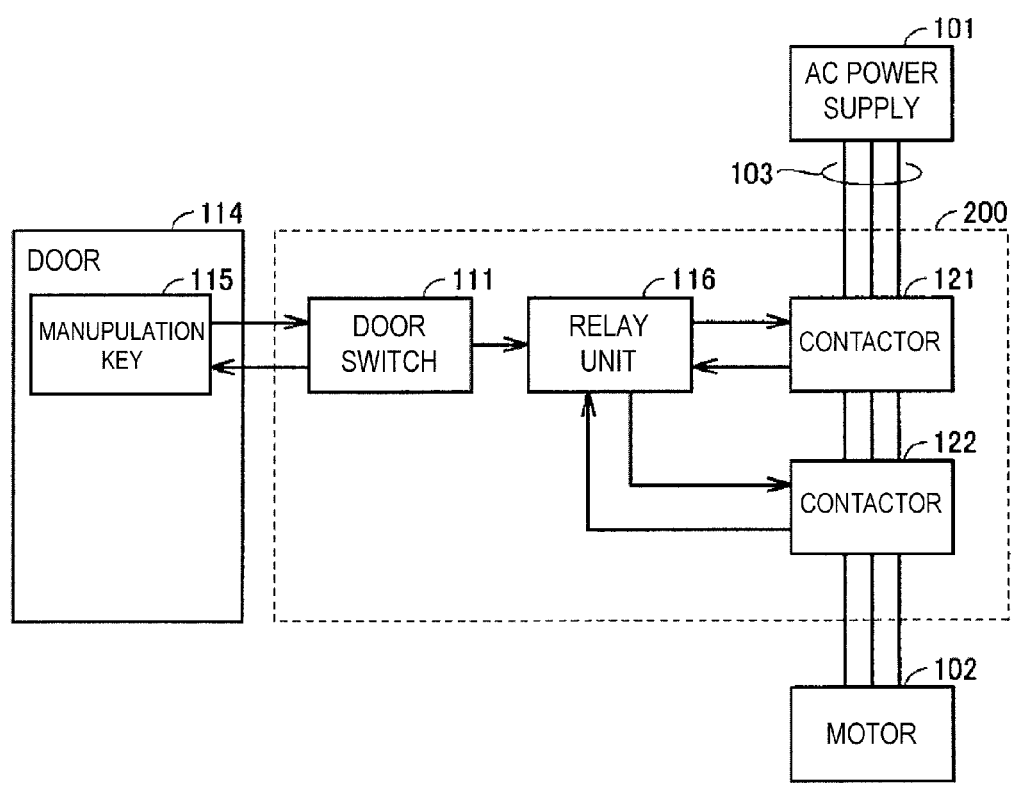
FIG. 12 is a view illustrating a configuration example of a conventional safety circuit.
Figure 14:
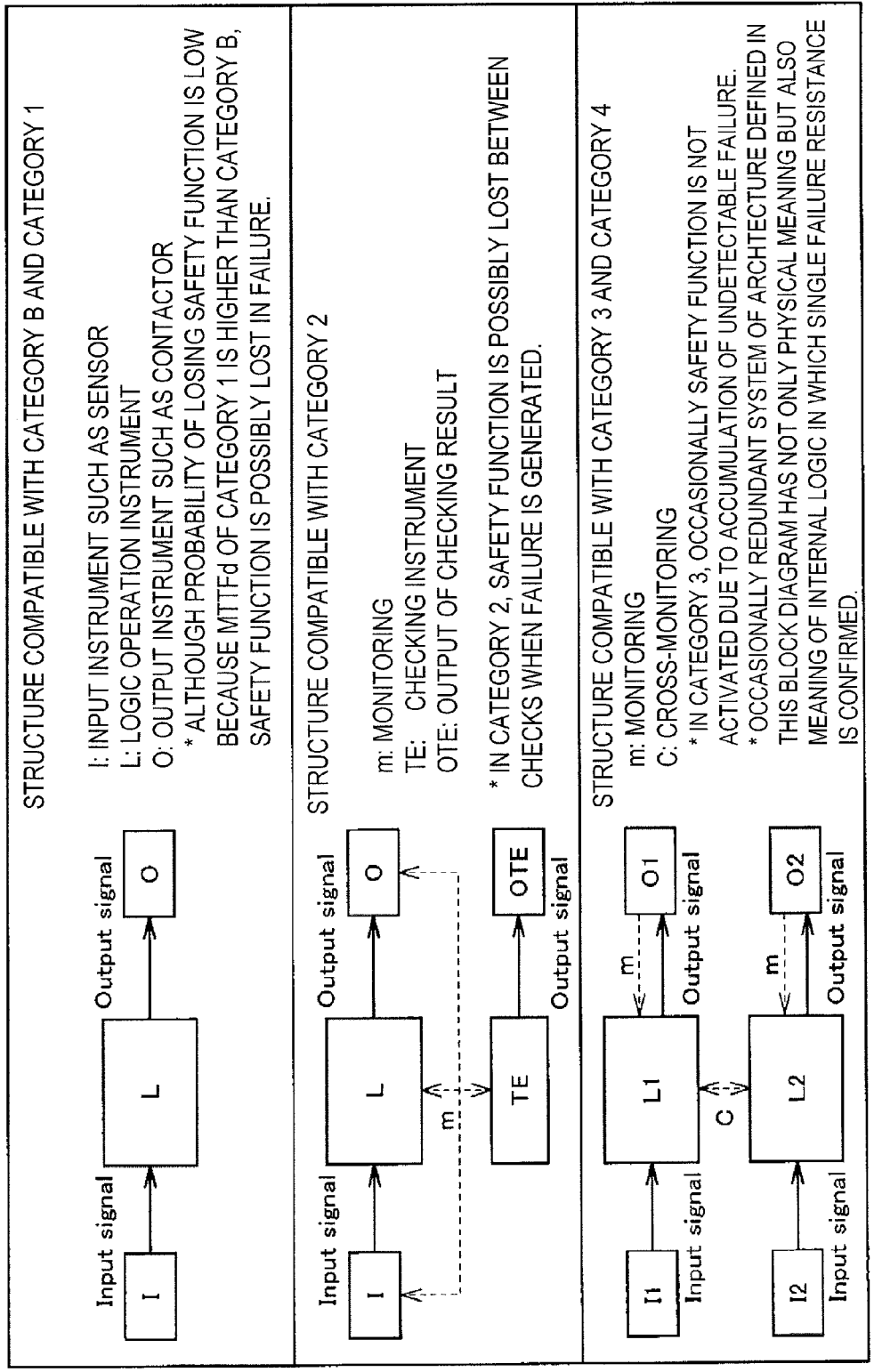
FIG. 14 is a block diagram for explaining requirements of a safety control system required for each category, which are expressed by ISO 13849-1:2006.

FIG. 11 is a schematic diagram illustrating a configuration of the beam sensor illustrated in FIG. 10. Referring to FIG. 11, the beam sensor 18 includes a phototransmitter 18a and a photoreceiver 18b. The phototransmitter 18a emits a light beam 18c, and the photoreceiver 18b receives the light beam 18c. The photoreceiver 18b outputs the H-level signal to the relay unit 16 when receiving the light beam 18c. On the other hand, when a person passes between the phototransmitter 18a and the photoreceiver 18b, the photoreceiver 18b cannot receive the light beam 18c because the light beam 18c is blocked. At this point, the photoreceiver 18b outputs the L-level signal to the relay unit 16.

In FIG. 11, the single beam sensor in which the phototransmitter emits the light beam along one optical axis is illustrated as the beam sensor by way of example. Alternatively, a multi-optical-axis photoelectric sensor such as a safety light curtain may be used as the beam sensor.

Referring to FIG. 10, in the fourth embodiment, the relay unit 16 that receives the signal from the beam sensor 18 turns on/off the contactor 21. The PLC 13 detects the abnormality of the beam sensor 18 based on the signal from the relay unit 16. The fourth embodiment differs from the second embodiment in these points.

When the relay unit 16 receives the L-level signal from the beam sensor 18 (when a person blocks the light beam), the relay unit 16 outputs the L-level signal to the contactor 21 and outputs the H-level signal to the PLC 13. On the other hand, when the relay unit 16 receives the H-level signal from the beam sensor 18 (when the photoreceiver receives the light beam because the person does not exists between the phototransmitter and the photoreceiver), the relay unit 16 outputs the H-level signal to the contactor 21 and outputs the L-level signal to the PLC 13. That is, an operation of the control system 100C is similar to the operation of the control system 100 of the first embodiment. Specifically the operation of the control system 100C is similar to the operation illustrated in FIGS. 5 to 7.

The control system 100C of the fourth embodiment having the configuration is operated similarly to the control system 100 of the first embodiment. In the fourth embodiment, similarly to the first embodiment, the general-purpose PLC monitors the input instrument (in the fourth embodiment, the beam sensor and the relay unit) and the output instrument. According to the fourth embodiment, similarly to the first embodiment, the control system compatible with the safety standard can advantageously be implemented by the simple configuration.

When the beam sensor 18 can output two signals (one of the signals becomes the H-level when the other signal has the L-level) similarly to the door switch 11, one of the signals may be input to the contactor 21 while the other signal is input to the PLC 13 similarly to the first embodiment. Therefore, because the relay unit 16 can be removed from the control system 100C, the cost reduction of the control system can further be achieved.

In the embodiments, the motor that is of the load is operated by the AC power from the AC power supply. Alternatively, the load may be operated by a DC power from a DC power supply. The kind of the load is not limited to the motor. For example, the load may be a heater.

It is understood that the disclosed embodiments are illustrative and not restrictive. The scope of the invention is defined by the appended claims rather than by the preceding descriptions, and meanings equivalent to the claims and all changes that fall within the claims are included therein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A control system comprising:
   an input instrument configured to generate a signal indicating permission and prohibition of running of a load;
   a power-supply unit configured to receive an input signal output from the input instrument, supply a three-phase driving power to the load when the load is permitted to run by the input signal from the input instrument, and cut off the supply of the three-phase driving power to the load when the load is prohibited from running by the input signal; and
   a monitoring device configured to monitor the input instrument and the power-supply unit,
   wherein the power-supply unit includes a first output unit and a second output unit, the first output unit is configured to cut off the supply of the three-phase driving power to the load when the load is prohibited from running by the input signal, the second output unit is configured to cut off the supply of the three-phase driving power to the load when a monitoring result of the monitoring device indicates an abnormal state in at least one of the input instrument and the first output unit, and
   wherein the control system is compatible with category 2 of ISO 13849-1.

2. The control system according to claim 1, wherein the monitoring device is not compatible with the category 2 of ISO 13849-1.

3. The control system according to claim 2, wherein the input instrument includes:
   a first signal generating unit configured to generate a first signal as the input signal input to the power-supply unit; and
   a second signal generating unit configured to generate a second signal indicating the permission and prohibition of the running of the load, wherein
   the power-supply unit outputs by the first output unit a third signal indicating the supply of the three-phase driving power to the load and the cutoff of the supply of the three-phase driving power, the supply of the three-phase driving power and the cutoff of the supply of the three-phase driving power being performed by the power-supply unit, and
   the monitoring device monitors the input instrument and the first output unit based on the second signal and the third signal.

4. The control system according to claim 3, wherein the monitoring device monitors a time difference between timing of a change of the second signal and timing of a change of the third signal, when the load is permitted to run, and when the load is prohibited from running.

5. The control system according to claim 4, wherein the monitoring device detects that the input instrument and the first output unit are normal by detecting that the time difference falls within a predetermined time.

6. The control system according to claim 4, wherein the monitoring device detects that the input instrument is abnormal, when a state of the second signal is not changed so as to indicate that the load is prohibited from running within a reference time since a state of the third signal is changed so as to indicate that the supply of the three-phase driving power to the load is cut off.

7. The control system according to claim 4, wherein the monitoring device detects that the first output unit is abnormal, when a state of the third signal is not changed so as to indicate that the three-phase driving power is supplied to the load within a reference time since a state of the second signal is changed so as to indicate that the load is permitted to run.

8. The control system as in claim 1,
   wherein the power-supply unit includes a first contactor as the first output unit and a second contactor as the second output unit that are inserted in and connected to a feeding pathway between the load and the three-phase driving power unit, and
   wherein the first contactor includes:
   a first relay that is provided in the feeding pathway to become an opened state and a closed state according to the first signal; and
   a second relay that is opened and closed independently of the first relay to generate the third signal.

9. The control system according to claim 8, further comprising a control device that is configured to control to put the first relay in the opened state and the closed state according to the input signal from the input instrument.

10. The control system as in claim 1, wherein the load is a motor, and the power-supply unit is a servo driver that drives the motor.

* * * * *